(12) United States Patent
Ivacic

(10) Patent No.: US 12,317,897 B2
(45) Date of Patent: Jun. 3, 2025

(54) METHODS OF CONTROLLING OR PREVENTING INFESTATION OF VEGETABLE, TOMATO AND POTATO PLANTS BY PHYTOPATHOGENIC MICROORGANISMS

(71) Applicant: SYNGENTA CROP PROTECTION AG, Basel (CH)

(72) Inventor: Damir Ivacic, Basel (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 536 days.

(21) Appl. No.: 16/955,443

(22) PCT Filed: Dec. 19, 2018

(86) PCT No.: PCT/EP2018/085986
§ 371 (c)(1),
(2) Date: Jun. 18, 2020

(87) PCT Pub. No.: WO2019/122012
PCT Pub. Date: Jun. 27, 2019

(65) Prior Publication Data
US 2020/0367496 A1  Nov. 26, 2020

(30) Foreign Application Priority Data
Dec. 20, 2017 (EP) .................. 17208993

(51) Int. Cl.
*A01N 43/40* (2006.01)
(52) U.S. Cl.
CPC .................. *A01N 43/40* (2013.01)
(58) Field of Classification Search
CPC ......... A01N 43/40; A01N 37/18; A01N 43/20
See application file for complete search history.

(56) References Cited

U.S. PATENT DOCUMENTS

| | | | |
|---|---|---|---|
| 9,414,589 B2 * | 8/2016 | O'Sullivan | A01N 37/18 |
| 9,867,371 B2 * | 1/2018 | O'Sullivan | C07C 255/57 |
| 11,053,201 B2 * | 7/2021 | Hone | A01N 43/40 |
| 2016/0157485 A1 | 6/2016 | O-Sullivan et al. | |

FOREIGN PATENT DOCUMENTS

| | | | | |
|---|---|---|---|---|
| CO | 7091186 A2 | 10/2014 | | |
| JP | 2015514077 A | 5/2015 | | |
| JP | 2016518385 A | 6/2016 | | |
| WO | 2007134799 A1 | 11/2007 | | |
| WO | 2007141009 A1 | 12/2007 | | |
| WO | WO-2013120940 A2 * | 8/2013 | ............. | A01N 37/18 |
| WO | 2013143811 A1 | 10/2013 | | |
| WO | 2014177487 A1 | 11/2014 | | |
| WO | 2015003951 A1 | 1/2015 | | |
| WO | WO-2016066644 A1 * | 5/2016 | ............. | A01N 37/18 |
| WO | 2017207362 A1 | 12/2017 | | |
| WO | 2019030307 A1 | 2/2019 | | |

OTHER PUBLICATIONS

Inami et al. "The Tomato Wilt Fungus *Fusarium oxysporum* f. sp. *lycopersici* shares Common Ancestors with Nonpathogenic F. oxysporum isolated from Wild Tomatoes in the Peruvian Andes" Microbes Environ. 2014, 29, 200-210. (Year: 2014).*
International Search Report and Written Opinion for International Application No. PCT/EP2018/085986, Mailed on Jan. 25, 2019.
Wikipedia; Овощные культуры (vegetable crops); https://ru.wikipedia.org/wiki/Овощные_культуры; pp. 1-11.
European Search Report issued in European Patent Application No. 18 816 170.7, mailed Jan. 11, 2024.
Anonymous: "Vegetable", Wikipedia, Dec. 3, 2017 (Dec. 3, 2017), p. 1, XP093115425, Retrieved from the Internet: URL:https://en.wikipedia.org/w/index.php?title=Vegetable&oldid=813494975 [retrieved on Jan. 2, 2024].

* cited by examiner

*Primary Examiner* — Amanda L. Aguirre
(74) *Attorney, Agent, or Firm* — BakerHostetler; Toni-Junell Herbert

(57) ABSTRACT

The present invention relates to methods for controlling or preventing infestation of vegetable, tomato and potato plants by phytopathogenic microorganisms selected from *Sphaerotheca fuliginea, Leveillula taurica, Sclerotinia sclerotiorum, Cercospora, Fusarium oxysporum, Fusarium solani, Helminthosporium solani, Phoma tuberosa, Rhizoctonia solani, Phytophthora infestans, Verticillium dahlia, Didymella bryoniae, Botrytis cinerea* and *Alternaria solani*, comprising applying to a crop of plants, the locus thereof, or propagation material thereof, a compound according to formula (I) wherein $R_1$, $R_2$, $R_3$, $R_4$, $R_5$, Y, A, B are as defined herein.

15 Claims, No Drawings

METHODS OF CONTROLLING OR PREVENTING INFESTATION OF VEGETABLE, TOMATO AND POTATO PLANTS BY PHYTOPATHOGENIC MICROORGANISMS

CROSS-REFERENCE TO RELATED APPLICATIONS

This application is a 371 National Stage application of International Application No. PCT/EP2018/085986 filed Dec. 19, 2018 which claims priority to EP 17208993.0 filed Dec. 20, 2017.

TECHNICAL FIELD

The present invention relates to methods for controlling or preventing infestation of vegetable, tomato and potato plants by phytopathogenic microorganisms, in particular *Erysiphe* sp., such as *Sphaerotheca fuliginea, Leveillula taurica, Sclerotinia sclerotiorum, Cercospora, Fusarium* sp., in particular *Fusarium oxysporum* and *solani, Helminthosporium solani, Phoma tuberosa, Rhizoctonia solani, Phytophthora infestans, Verticillium dahlia, Didymella bryoniae, Botrytis cinerea* and *Alternaria solani*.

BACKGROUND

Mildew, *sclerotinia* stem rot (white mold), leaf spot, fusaria, stem blight are widespread diseases in vegetable plants such as spinach, lettuce, asparagus, cabbages, carrots, onions or peppers. Early blight, fusaria, leafspot, powdery mildew are widespread diseases for tomatoes and tuber diseases (such as silver scurf and black scurf), mildew, *sclerotinia*, early blight are widespread diseases for potato plants.

*Alternaria solani* in particular is a fungal pathogen called early blight on potato and this disease produces distinctive leaf spots and can also cause stem lesions and fruit rot on tomato and tuber blight on potato. If uncontrolled, early blight can cause significant yield reductions. *Fusarium oxysporum* is a fungal pathogen that attacks a broad range of host plants. The symptoms of *Fusarium oxysporum* are yellowing between the large veins, chlorosis, wilting or necrosis of leaves. If uncontrolled, *Fusarium oxysporum* can cause significant plant losses and yield reductions.

These diseases have a bad impact on the agricultural output and hence, there is a need to provide efficient alternative methods to common practices for controlling or preventing these pests in vegetable, tomato and potato plants. Thus, the current invention provides further methods for controlling or preventing infestation of vegetable, tomato and potato plants by phytopathogenic microorganisms which cause diseases such as mildew, *sclerotinia* stem rot (white mold), leaf spot, fusaria, stem blight, early blight, leafspot and *sclerotinia*.

DESCRIPTION OF THE EMBODIMENTS

Cyclobutylcarboxamide compounds and processes for their preparation have been disclosed in WO2013/143811 and WO2015/003951. It has now been surprisingly found that particular cyclobutylcarboxamide compounds disclosed in WO2013/143811 and/or WO2015/003951 are highly effective at controlling or preventing the infestation of vegetable, tomato and potato plants by phytopathogenic microorganisms, in particular *Erysiphe* sp., such as *Sphaerotheca fuliginea, Leveillula taurica, Sclerotinia sclerotiorum, Cercospora, Fusarium* sp., in particular *Fusarium oxysporum* and *solani, Helminthosporium solani, Phoma tuberosa, Rhizoctonia solani, Phytophthora infestans, Verticillium dahlia, Didymella bryoniae, Botrytis cinerea* and *Alternaria solani*. These highly effective compounds thus represent an important new solution for farmers to control or prevent infestation of vegetable, tomato and potato plants by diseases such as mildew, *sclerotinia* stem rot (white mold), leaf spot, fusaria, stem blight, early blight, fusaria, leafspot and *sclerotinia*.

Hence, as embodiment 1, there is provided a method of controlling or preventing infestation of vegetable, tomato and potato plants by phytopathogenic microorganisms selected from *Sphaerotheca fuliginea, Leveillula taurica, Sclerotinia sclerotiorum, Cercospora, Fusarium oxysporum, Fusarium solani, Helminthosporium solani, Phoma tuberosa, Rhizoctonia solani, Phytophthora infestans, Verticillium dahlia, Didymella bryoniae, Botrytis cinerea* and *Alternaria solani*, comprising applying to a crop of plants, the locus thereof, or propagation material thereof, a compound according to formula (I)

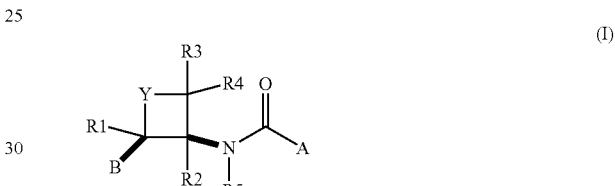

wherein
Y is O, C=O, or CR12R13;
A is a 5- or 6-membered heteroaromatic ring containing 1 to 3 heteroatoms, each independently selected from oxygen, nitrogen and sulphur, or a phenyl ring; the heteroaromatic ring or the phenyl being optionally substituted by one or more R6;
R6 is, independently of each other, halogen, cyano, C1-C4-alkyl, C1-C4-haloalkyl, C1-C4-alkoxy, C1-C4-haloalkoxy, C1-C4-haloalkylthio, C1-C4-alkoxy-C1-4-alkyl or C1-C4-haloalkoxy-C1-C4-alkyl;
R1, R2, R3, R4, R12 and R13, independently of each other, are hydrogen, halogen, cyano, C1-C4-alkyl, C1-C4-alkoxy or C1-C4-haloalkyl,
R5 is hydrogen, methoxy or hydroxyl,
B is phenyl substituted by one or more R8,
R8 is, independently of each other, halogen, cyano or a group -L-R9, where each L is independently of each other a bond, —O—, —OC(O)—, —NR7-, —NR7CO—, —NR7S(O)n-, —S(O)n-, —S(O)nNR7-, —COO— or CONR7-,
n is 0, 1 or 2,
R7 is hydrogen, C1-C4-alkyl, C1-C4-haloalkyl, benzyl or phenyl, where benzyl and phenyl is unsubstituted or substituted with halogen, cyano, C1-C4-alkyl or C1-C4-haloalkyl,
R9 is, independently of each other, C1-C6-alkyl, which is unsubstituted or substituted by one or more R10, C3-C6-cycloalkyl, which is unsubstituted or substituted by one or more R10, C6-C14-bicycloalkyl, which is unsubstituted or substituted by one or more R10, C2-C6-alkenyl, which is unsubstituted or substituted by one or more R10, C2-C6-alkynyl, which is unsubstituted or substituted by one or more R10, phenyl, which is unsubstituted or substituted by R10, or heteroaryl, which is unsubstituted or substituted by one or more R10, R10 is, independently of each other, halogen, cyano, C1-C4-alkyl, C1-C4-haloalkyl, C1-C4-alkoxy, C1-C4-haloalkoxy, C1-C4-alkylthio, C1-C4-haloalkylthio, C3-C6-alkenyloxy, or C3-C6-alkynyloxy; or a salt or N-oxide thereof;

wherein B and A-CO—NR5 are cis to each other on the four-membered ring, or a tautomer or stereoisomer of these compounds.

More preferred methods according to embodiment 1 are given in the embodiments below.

As embodiment 2, there is provided a method according to embodiment 1 wherein

Y is O or CH2;

A is a 6-membered heteroaromatic ring containing 1 to 2 nitrogen atoms, or a phenyl ring; the heteroaromatic ring or the phenyl being optionally substituted by one or more R6;

R6 is, independently of each other, halogen, cyano, C1-C4-alkyl, C1-C4-haloalkyl, or C1-C4-haloalkoxy;

R1, R2, R3, R4, and R5 are each hydrogen;

B is phenyl substituted by one or more R8;

R8 is, independently of each other, selected from halogen, cyano, C1-C4-alkyl, C1-C4-haloalkyl, C1-C4-haloalkoxy and C3-C6-cycloalkyl.

As embodiment 3, there is provided a method according to either embodiment 1 or embodiment 2 wherein A is a 6-membered heteroaromatic ring containing 1 to 2 nitrogen atoms and having 1 to 3 substituents selected from R6, or a phenyl ring having 1 or 3 substitutents selected from R6.

As embodiment 4, there is provided a method according to any one of embodiments 1 to 3 wherein B is a phenyl substituted by 1 to 3 substitutents R8.

As embodiment 5, there is provided a method according to any one of embodiments 1 to 4 wherein B is a phenyl substituted by 1 to 3 substituents independently selected from fluoro, chloro, trifluoromethyl, cyclopropyl, difluoromethoxy and trifluoromethoxy;

A is a phenyl, pyridyl or pyrazinyl, which rings, independently of each other, are unsubstituted or substituted by 1 to 3 substituents, independently selected from chloro, bromo, fluoro, methyl, cyano, and trifluoromethyl, Y is O or CH2, and R1, R2, R3, R4 and R5 are each hydrogen.

As embodiment 6, there is provided a method according to any one of embodiments 1 to 5 wherein Y is CH2;

B is a mono or di-halogen substituted phenyl;

A is selected from phenyl, pyrazinyl and pyridyl, each of which is mono or di-substituted by substituents independently selected from halogen and C1-C4-haloalkyl;

R1, R2, R3, R4 and R5 are each hydrogen.

Compounds of formula (I) as disclosed in any one of embodiments 1 to 6 represent the cis racemate: the phenyl ring on the left hand side and the A-C(=O)—NH group on the right hand side are cis to each other on the cyclobutyl ring:

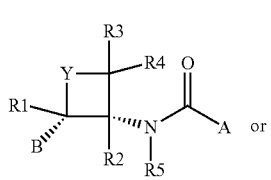

(Ia)

or

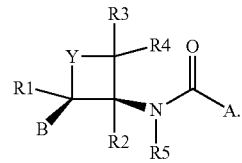

(Ib)

Thus, the racemic compound of formula (I) is a 1:1 mixture of the compounds of formula (Ia) and (Ib). The wedged bonds shown in the compounds of formula (Ia) and (Ib) represent absolute stereochemistry, whereas the thick straight bonds such as those shown for the compounds of formula (I) in embodiment 1 represent relative stereochemistry in racemic compounds.

It has also surprisingly been found that one enantiomer of the compounds of formula (I) is particularly useful in controlling or preventing the infestation of vegetable, tomato and potato plants by phytopathogenic microorganisms selected from *Sphaerotheca fuliginea, Leveillula taurica, Sclerotinia sclerotiorum, Cercospora, Fusarium oxysporum, Fusarium solani, Helminthosporium solani, Phoma tuberosa, Rhizoctonia solani, Phytophthora infestans, Verticillium dahlia, Didymella bryoniae, Botrytis cinerea* and *Alternaria solani*.

Thus, as embodiment 7, there is provided the method according to any one of embodiments 1 to 6 wherein the compound is of formula (Ia)

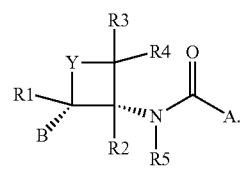

(Ia)

A skilled person is aware that according to the method of embodiment 7, the compound of formula (Ia) is generally applied as part of a pesticidal composition. Hence, as embodiment 8, there is provided a method of controlling or preventing infestation of vegetable, tomato and potato plants by phytopathogenic microorganisms selected from *Sphaerotheca fuliginea, Leveillula taurica, Sclerotinia sclerotiorum, Cercospora, Fusarium oxysporum, Fusarium solani, Helminthosporium solani, Phoma tuberosa, Rhizoctonia solani, Phytophthora infestans, Verticillium dahlia, Didymella bryoniae, Botrytis cinerea* and *Alternaria solani*, comprising applying to a crop of plants, the locus thereof, or propagation material thereof a pesticidal composition comprising a compound according to anyone of embodiments 1-7 and one or more formulation adjuvants. As embodiment 9, there is provided a method of controlling or preventing infestation of vegetable, tomato and potato plants by phytopathogenic microorganisms selected from *Sphaerotheca fuliginea, Leveillula taurica, Sclerotinia sclerotiorum, Cercospora, Fusarium oxysporum, Fusarium solani, Helminthosporium solani, Phoma tuberosa, Rhizoctonia solani, Phytophthora infestans, Verticillium dahlia, Didymella bryoniae, Botrytis cinerea* and *Alternaria solani*, comprising applying to a crop of plants, the locus thereof, or propagation material thereof a pesticidal composition comprising a compound of formula (Ia) and one or more formulation adjuvants. In a method according to embodiment 9, for pesticidal compositions comprising both a compound of formula (Ia) and a compound of formula (Ib), the ratio of the compound of formula (Ia) to its enantiomer (the compound of formula (Ib)) must be greater than 1:1. Preferably, the ratio of the compound of formula (Ia) to the compound of formula (Ib) is greater than 1.5:1, more preferably greater than 2.5:1, especially greater than 4:1, advantageously greater than 9:1, desirably greater than 20:1, in particular greater than 35:1.

Mixtures containing up to 50%, preferably up to 40%, more preferably up to 30%, especially up to 20%, advantageously up to 10%, desirably up to 5%, in particular up to 3%, of the trans stereoisomers of the compounds of formula (I) (i.e. wherein the B and the A-C(=O)—NH groups are trans to each other) are also understood to be part of this invention. Preferably, the ratio of the compound of formula (I) to its trans isomer is greater than 1.5:1, more preferably greater than 2.5:1, especially greater than 4:1, advantageously greater than 9:1, desirably greater than 20:1, in particular greater than 35:1.

Preferably, in a composition comprising the compound of formula (Ia), its trans isomer (i.e. wherein the B and the A-CO—NR2 groups are trans to each other) and the compound of formula (Ib), the composition comprises the compound of formula (Ia) in a concentration of at least 50%, more preferably 70%, even more preferably 85%, in particular over 90%, and particularly preferably over 95%, each based on the total amount of compound of formula (Ia), its trans isomer and the compound of formula (Ib).

Further, as embodiment 10, there is provided a method of controlling or preventing infestation of vegetable, tomato and potato plants by phytopathogenic microorganisms selected from *Sphaerotheca fuliginea, Leveillula taurica, Sclerotinia sclerotiorum, Cercospora, Fusarium oxysporum, Fusarium solani, Helminthosporium solani, Phoma tuberosa, Rhizoctonia solani, Phytophthora infestans, Verticillium dahlia, Didymella bryoniae, Botrytis cinerea* and *Alternaria solani*, comprising applying to a crop of plants, the locus thereof, or propagation material thereof, a compound according to formula (Ic)

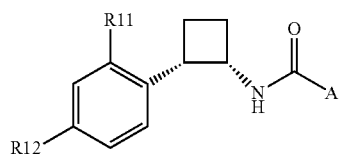

(Ic)

wherein

R11 and R12 are independently selected from halogen;

A is pyridyl which is substituted by one or two substituents independently selected from halogen and $C_1$-$C_4$-haloalkyl.

As embodiment 11, there is provided a method according to embodiment 10, wherein R11 and R12 are independently selected from chloro and fluoro;

A is pyrid-2-yl or pyrid-3-yl, which is substituted by one or two $C_1$-$C_4$-haloalkyl substituents.

As embodiment 12, there is provided a method according to embodiments 10 or 11, wherein A is selected from

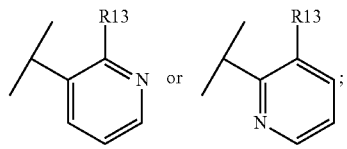

R13 is $C_1$-$C_4$-haloalkyl, preferably trifluoromethyl.

As embodiment 13, there is provided a method according to any one of embodiments 10 to 12 wherein the compound is selected from any one of compounds 1 to 7 of formula (Ic)

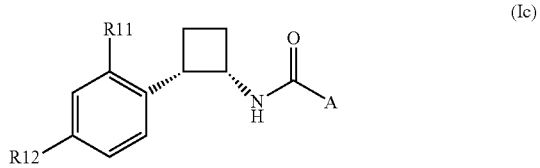

(Ic)

wherein R11, R12 and A are as defined in the following table:

| Compound | A | R11 | R12 |
|---|---|---|---|
| 1 | 2-trifluoromethyl-pyrid-3-yl | Cl | Cl |
| 2 | 3-trifluoromethyl-pyrid-2-yl | Cl | Cl |
| 3 | 3-trifluoromethyl-pyrid-2-yl | F | F |
| 4 | 3-trifluoromethyl-pyrid-2-yl | Cl | F |
| 5 | 3-chloro-pyrid-2-yl | Cl | Cl |
| 6 | 2-methyl-pyrid-3-yl | Cl | Cl |
| 7 | 2-trifluoromethyl-pyrid-3-yl | Cl | F |

As embodiment 14, there is provided the method according to any one of embodiments 1 to 13 comprising the steps
  providing a composition comprising a compound as defined in any one of embodiments 1 to 13;
  applying the composition to a propagation material;
  planting the propagation material.

As embodiment 15, there is provided the method according to any one of embodiments 1 to 13 comprising the steps
  providing a composition comprising a compound as defined in any one of embodiments 1 to 13;
  applying the composition to a crop of plants or the locus thereof.

As embodiment 16, there is provided the use of a compound as defined in any one of embodiments 1 to 13 for controlling or preventing infestation of vegetable, tomato and potato plants by *Sphaerotheca fuliginea*.

As embodiment 16.1, there is provided the use of a compound as defined in any one of embodiments 1 to 13 for controlling or preventing infestation of vegetable, tomato and potato plants by infestation of vegetable, tomato and potato plants by *Botrytis cinerea*, in particular there is provided the use of a compound as defined in any one of embodiments 1 to 13 for controlling or preventing infestation of tomato plants by *Botrytis cinerea*.

As embodiment 16.2, there is provided the use of a compound as defined in any one of embodiments 1 to 13 for controlling or preventing infestation of vegetable, tomato and potato plants by *Fusarium oxysporum*, in particular there is provided the use of a compound as defined in any one of embodiments 1 to 13 for controlling or preventing infestation of vegetable plants by *Fusarium oxysporum*, more particularly there is provided the use of a compound as defined in any one of embodiments 1 to 13 for controlling or preventing infestation of a plant selected from tomato, okra and melon by *Fusarium oxysporum*.

As embodiment 17, there is provided the use of a compound as defined in any one of embodiments 1 to 13 for controlling or preventing infestation of vegetable, tomato and potato plants by *Alternaria Solani*, in particular there is provided the use of a compound as defined in any one of embodiments 1 to 13 for controlling or preventing infestation of tomato or potato plants by *Alternaria solani*, more particularly there is provided the use of a compound as defined in any one of embodiments 1 to 13 for controlling or preventing infestation of potato plants by *Alternaria solani*.

As embodiment 18, there is provided a method for growing vegetable, tomato and potato plants comprising applying or treating vegetable, tomato and potato plants or propagation material thereof with a compound as defined in any one of claims 1 to 13.

The preparation of the compounds as defined in the methods of any one of embodiments 1 to 13 has been disclosed in WO2013/143811 and WO2015/003951 which are incorporated herein by reference.

Definitions

The term "halogen" represents fluoro, chloro, bromo or iodo, particularly fluoro, chloro or bromo.

The term "alkyl" or "alk" as used herein either alone or as part of a larger group (such as alkoxy, alkylthio, alkoxycarbonyl and alkylcarbonyl) is a straight or branched chain and is, for example, methyl, ethyl, n-propyl, n-butyl, isopropyl, sec-butyl, isobutyl, tert-butyl, pentyl, iso-pentyl or n-hexyl. The alkyl groups are suitably $C_1$-$C_4$-alkyl groups.

"Haloalkyl" as used herein are alkyl groups as defined above which are substituted with one or more of the same or different halogen atoms and are, for example, $CF_3$, $CF_2Cl$, $CF_2H$, $CCl_2H$, $FCH_2$, $ClCH_2$, $BrCH_2$, $CH_3CHF$, $(CH_3)_2CF$, $CF_3CH_2$ or $CHF_2CH_2$.

The term "vegetable" or "vegetable plant" includes but is not limited to okra, spinach, lettuce, asparagus, cabbages, carrots, onions, peppers, cucumbers, squashes and melons.

As used herein, when one embodiment refers to several other embodiments by using the term "according to any one of", for example "according to any one of embodiments 1 to 5", then said embodiment refers not only to embodiments indicated by the integers such as 1 and 2 but also to embodiments indicated by numbers with a decimal component such as 1.1, 1.2 or 2.1, 2.2, 2.3. For example, "according to any one of embodiments 1 to 3" means according to any one of embodiments 1, 1.1, 2, 3, 3.1, 3.2, 3.3, 3.4, 3.5, 3.6, 3.7.

The methods and uses according to any one of embodiments 1 to 18 are preferably for controlling or preventing infestation of vegetable, tomato and potato crop by phytopathogenic microorganisms selected from *Erysiphe* sp. *Sphaerotheca fuliginea*, *Sclerotinia sclerotiorum*, *Cercospora*, *Fusarium oxysporum*, *Helminthosporium solani*, *Phoma tuberosa*, *Rhizoctonia solani*, *Fusarium solani*, *Phytophthora infestans*, *Verticillium dahlia*, *Didymella bryoniae*, *Botrytis cinerea*, *Alternaria solani* and *Leveillula taurica*, including fungi that are resistant to other fungicides. Fungi that are "resistant" to particular fungicides refer e.g. to strains that are less sensitive to that fungicide compared to the expected sensitivity of the same species. The expected sensitivity can be measured using e.g. a strain that has not previously been exposed to the fungicide.

Application according to the methods or uses according to any one of embodiments 1 to 18 is preferably to a crop of plants, the locus thereof or propagation material thereof. Preferably application is to the locus of the plant or the propagation material of the plant, more preferably to the propagation material. Application of the compounds according to any one of embodiments 1 to 13 can be performed according to any of the usual modes of application, e.g. foliar, drench, soil, in furrow, seed treatment etc.

The compounds as defined in any one of embodiments 1 to 13 are preferably used for pest control at 1 to 500 g/ha, preferably 50-200 g/ha.

The compounds as defined in any one of embodiments 1 to 13 are suitable for use on any vegetable, tomato and potato plant, including those that have been genetically modified to be resistant to active ingredients such as herbicides, or to produce biologically active compounds that control infestation by plant pests.

Generally, a compound as defined in any one of embodiments 1 to 13 is used in the form of a composition (e.g. formulation) containing a carrier. A compound as defined in any one of embodiments 1 to 13 and compositions thereof can be used in various forms such as aerosol dispenser, capsule suspension, cold fogging concentrate, dustable powder, emulsifiable concentrate, emulsion oil in water, emulsion water in oil, encapsulated granule, fine granule, flowable concentrate for seed treatment, gas (under pressure), gas generating product, granule, hot fogging concentrate, macrogranule, microgranule, oil dispersible powder, oil miscible flowable concentrate, oil miscible liquid, paste, plant rodlet, powder for dry seed treatment, seed coated with a pesticide, soluble concentrate, soluble powder, solution for seed treatment, suspension concentrate (flowable concentrate), ultra low volume (ulv) liquid, ultra low volume (ulv) suspension, water dispersible granules or tablets, water dispersible powder for slurry treatment, water soluble granules or tablets, water soluble powder for seed treatment and wettable powder.

A formulation typically comprises a liquid or solid carrier and optionally one or more customary formulation auxiliaries, which may be solid or liquid auxiliaries, for example unepoxidized or epoxidized vegetable oils (for example epoxidized coconut oil, rapeseed oil or soya oil), antifoams, for example silicone oil, preservatives, clays, inorganic compounds, viscosity regulators, surfactant, binders and/or tackifiers. The composition may also further comprise a fertilizer, a micronutrient donor or other preparations which influence the growth of plants as well as comprising a combination containing the compound of the invention with one or more other biologically active agents, such as bactericides, fungicides, nematicides, plant activators, acaricides, and insecticides.

The compositions are prepared in a manner known per se, in the absence of auxiliaries for example by grinding, screening and/or compressing a solid compound of the present invention and in the presence of at least one auxiliary for example by intimately mixing and/or grinding the compound of the present invention with the auxiliary (auxiliaries). In the case of solid compounds of the invention, the grinding/milling of the compounds is to ensure specific particle size.

Examples of compositions for use in agriculture are emulsifiable concentrates, suspension concentrates, microemulsions, oil dispersibles, directly sprayable or dilutable solutions, spreadable pastes, dilute emulsions, soluble powders, dispersible powders, wettable powders, dusts, granules or encapsulations in polymeric substances, which comprise—at least—a compound as defined in any one embodiments 1 to 13 and the type of composition is to be selected to suit the intended aims and the prevailing circumstances.

As a rule, the compositions comprise 0.1 to 99%, especially 0.1 to 95%, of compound as defined in any one of embodiments 1 to 7 and 1 to 99.9%, especially 5 to 99.9%, of at least one solid or liquid carrier, it being possible as a rule for 0 to 25%, especially 0.1 to 20%, of the composition to be surfactants (% in each case meaning percent by weight). Whereas concentrated compositions tend to be preferred for commercial goods, the end consumer as a rule uses dilute compositions which have substantially lower concentrations of active ingredient.

Examples of foliar formulation types for pre-mix compositions are:

GR: Granules
WP: wettable powders
WG: water dispersable granules (powders)
SG: water soluble granules
SL: soluble concentrates
EC: emulsifiable concentrate
EW: emulsions, oil in water
ME: micro-emulsion
SC: aqueous suspension concentrate
CS: aqueous capsule suspension
OD: oil-based suspension concentrate, and
SE: aqueous suspo-emulsion.

Whereas, examples of seed treatment formulation types for pre-mix compositions are:

WS: wettable powders for seed treatment slurry
LS: solution for seed treatment
ES: emulsions for seed treatment
FS: suspension concentrate for seed treatment
WG: water dispersible granules, and
CS: aqueous capsule suspension.

Examples of formulation types suitable for tank-mix compositions are solutions, dilute emulsions, suspensions, or a mixture thereof, and dusts.

As with the nature of the formulations, the methods of application, such as foliar, drench, spraying, atomizing, dusting, scattering, coating or pouring, are chosen in accordance with the intended objectives and the prevailing circumstances.

The tank-mix compositions are generally prepared by diluting with a solvent (for example, water) the one or more pre-mix compositions containing different pesticides, and optionally further auxiliaries.

Suitable carriers and adjuvants can be solid or liquid and are the substances ordinarily employed in formulation technology, e.g. natural or regenerated mineral substances, solvents, dispersants, wetting agents, tackifiers, thickeners, binders or fertilizers.

Generally, a tank-mix formulation for foliar or soil application comprises 0.1 to 20%, especially 0.1 to 15%, of the desired ingredients, and 99.9 to 80%, especially 99.9 to 85%, of a solid or liquid auxiliaries (including, for example, a solvent such as water), where the auxiliaries can be a surfactant in an amount of 0 to 20%, especially 0.1 to 15%, based on the tank-mix formulation.

Typically, a pre-mix formulation for foliar application comprises 0.1 to 99.9%, especially 1 to 95%, of the desired ingredients, and 99.9 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Normally, a tank-mix formulation for seed treatment application comprises 0.25 to 80%, especially 1 to 75%, of the desired ingredients, and 99.75 to 20%, especially 99 to 25%, of a solid or liquid auxiliaries (including, for example, a solvent such as water), where the auxiliaries can be a surfactant in an amount of 0 to 40%, especially 0.5 to 30%, based on the tank-mix formulation.

Typically, a pre-mix formulation for seed treatment application comprises 0.5 to 99.9%, especially 1 to 95%, of the desired ingredients, and 99.5 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Whereas commercial products will preferably be formulated as concentrates (e.g., pre-mix composition (formulation)), the end user will normally employ dilute formulations (e.g., tank mix composition).

Preferred seed treatment pre-mix formulations are aqueous suspension concentrates. The formulation can be applied to the seeds using conventional treating techniques and machines, such as fluidized bed techniques, the roller mill method, rotostatic seed treaters, and drum coaters. Other methods, such as spouted beds may also be useful. The seeds may be presized before coating. After coating, the seeds are typically dried and then transferred to a sizing machine for sizing. Such procedures are known in the art. The compounds of the present invention are particularly suited for use in soil and seed treatment applications.

In general, the pre-mix compositions of the invention contain 0.5 to 99.9 especially 1 to 95, advantageously 1 to 50, % by mass of the desired ingredients, and 99.5 to 0.1, especially 99 to 5, % by mass of a solid or liquid adjuvant (including, for example, a solvent such as water), where the auxiliaries (or adjuvant) can be a surfactant in an amount of 0 to 50, especially 0.5 to 40, % by mass based on the mass of the pre-mix formulation.

The invention will now be illustrated by the following non-limiting Examples. All citations are incorporated by reference.

BIOLOGICAL EXAMPLES

*Botryotinia fuckeliana* (*Botrytis cinerea*) on Tomato 4-week old tomato plants cv. Roter Gnom are sprayed in a spray chamber with the formulated test compound diluted in water. The test plants are inoculated by spraying them with a spore suspension two days after application. The inoculated test plants are incubated at 20° C. and 95% relative humidity in a greenhouse and the percentage leaf area covered by disease is assessed when an appropriate level of disease appears on untreated check plants (5-6 days after application).

| Rates mg AI/liter | Treatment | | | | |
|---|---|---|---|---|---|
| | Control non-infected | Control infected | Compound 1 | Compound 7 | Compound 4 |
| | | | % efficacy | | |
| 200 | — | — | 97 | 100 | 97 |
| 60 | — | — | 95 | 97 | 97 |
| 20 | — | — | 97 | 95 | 90 |

-continued

| | Treatment | | | | |
|---|---|---|---|---|---|
| Rates mg AI/liter | Control non-infected | Control infected | Compound 1 | Compound 7 | Compound 4 |
| | | | % efficacy | | |
| 6 | — | — | 83 | 79 | 90 |
| 2 | — | — | 79 | 79 | 86 |
| 0 | 100 | 0 | — | — | — |

*Alternaria solani* on Tomato 4-week old tomato plants cv. Roter Gnom are sprayed in a spray chamber with the formulated test compound diluted in water. The test plants are inoculated by spraying them with a spore suspension two days after application. The inoculated test plants are incubated at 22/18° C. (day/night) and 95% relative humidity in a greenhouse and the percentage leaf area covered by disease is assessed when an appropriate level of disease appears on untreated check plants (5-7 days after application).

| | Treatment | | | | |
|---|---|---|---|---|---|
| Rates mg AI/liter | Control non-infected | Control infected | Compound 1 | Compound 7 | Compound 4 |
| | | | % efficacy | | |
| 200 | — | — | 95 | 97 | 94 |
| 60 | — | — | 95 | 87 | 81 |
| 20 | — | — | 95 | 68 | 61 |
| 6 | — | — | 90 | 61 | 55 |
| 2 | — | — | 81 | 48 | 48 |
| 0 | 100 | 0 | — | — | — |

*Alternaria solani* on Potato:

A potato field trial was carried out in Tompkins, New York, USA in 2018 to evaluate the efficacy of different compounds against early blight disease caused by *Alternaria solani*.

The potato tubers were applied in-furrow at planting by using boom sprayer with a flat fan nozzle. The disease occurred beginning of August and an assessment on disease severity and was done Sep. 5, 2018.

Trial Location:

| Trial Location | Sown | Crop | Variety | Resistance Status |
|---|---|---|---|---|
| Tompkins/NY | 11$^{th}$ Jun. 2018 | Potato | Red Norland | Susceptible |

Treatment List—Field Trials:

| Treatment | Active ingredient (AI) Rate (g AI/ha) | Application method |
|---|---|---|
| 1 CHECK | — | — |
| 2 COMPOUND 1 SC 450 | 100 | Spray In-Furrow at planting |
| 3 COMPOUND 1 SC 450 | 150 | Spray In-Furrow at planting |
| 4 COMPOUND 1 SC 450 | 200 | Spray In-Furrow at planting |
| 5 COMPOUND 1 SC 450 | 250 | Spray In-Furrow at planting |
| 6 COMPOUND 2 SC500: Commercial standard: Succinate dehydrogenase inhibitor SC500 (Fluopyram) | 250 | Spray In-Furrow at planting |

Crops and Targets Occurred in the Trial:

| | Latin name | Common name |
|---|---|---|
| Target | *Alternaria solani* | Early Blight |
| Crop | *Solanum tuberosum* | Potato |

Crop Description:

| Test Crop | Potato |
|---|---|
| Variety | Red Norland |
| Sowing or Planting Date | Nov. 6, 2018 |

Trial Layout:

| Trial Environment (Test Method) | Field trial |
|---|---|
| Experimental Design | Randomized Complete Block |
| Plot size | 9.3 m2 |
| # replications | 4 |

Application Details:

| Application Date | Nov. 6, 2018 |
|---|---|
| Appl. Equipment Type | Boom sprayer with a flat fan nozzle |
| Application method | Spray In-Furrow at planting |
| Slurry Volume | 400 ml/100 kg seeds |
| Treatments applied | 2, 3, 4, 5, 6 |

Assessments:
Pest Severity, 89 Days after Planting

| Treatment | AI Rate (g AI/ha) | Pest severity (%), significantly different (Treatments with no letter in common are significantly different at the 5% probability level) | % efficacy based on pest severity |
|---|---|---|---|
| 1 CHECK | — | 97.25, A | 0.00 |
| 2 COMPOUND 1 SC 450 | 100 | 36.25, B | 62.21 |
| 3 COMPOUND 1 SC 450 | 150 | 12.25, C | 87.40 |
| 4 COMPOUND 1 SC 450 | 200 | 6.62, C | 93.19 |
| 5 COMPOUND 1 SC 450 | 250 | 6.50, C | 93.31 |
| 6 COMPOUND 2 SC 500 | 250 | 19.75, C | 79.69 |

CONCLUSION

Compound 1 showed very good activity against *Alternaria solani* in potato at a rate of 150 g AI/ha and higher, with an efficacy greater than 87%. Compound 2 performed well but was clearly weaker than compound 1. Both compounds provided disease control over a duration of 89 days after planting.

*Fusarium oxysporum* in Tomato:

A tomato greenhouse trial was carried out in Sanlucar de Barrameda, Cadiz, Spain in 2017 to evaluate the efficacy of different compounds against *Fusarium oxysporum* in tomato.

Three week old tomato plants were transplanted on Apr. 7, 2017 and the afterwards drench applied with the compounds using a water volume of 100 ml per plant.

In order to increase the disease pressure 60 ml *Fusarium oxysporum* suspension with a concentration of 1'000'000 spores per milliliter of water was drenched directly in the planting hole were the plants will be transplanted the next day. The assessment on disease incidence and was done 132 days after transplanting on Aug. 17, 2017.

Trial Location:

| Location | Transplanted | Crop | Variety | Resistance Status |
|---|---|---|---|---|
| El Ejido, Almeria, Spain | 7th Apr. 2017 | Tomato | Irati | Susceptible |

Treatment List—Field Trials:

| | Treatment | AI Rate (g AI/ha) | Application method |
|---|---|---|---|
| 1 | CHECK | — | — |
| 2 | COMPOUND 1 SC 450 | 100 | Drench at planting |
| 3 | COMPOUND 2 SC 200: Succinate dehydrogenase inhibitor (PYDIFLUMETOFEN) | 100 | Drench at planting |
| 4 | COMPOUND 3: RUDIS 480 SC (PROTHIOCONAZOLE) | 200 | Drench at planting |
| 5 | COMPOUND 4: TOPSIN M 70 WG (THIOPHANATE-METHYL) | 840 | Drench at planting |

Crops and Targets Occurred in the Trial

| | Latin name | Common name |
|---|---|---|
| Target | *Fusarium oxysporum* | Fusarium wilt |
| Crop | *Solanum lycopersicum* | Tomato |

Crop Description:

| Test Crop | Tomato |
|---|---|
| Variety | Irati |
| Sowing density | 20000 plants/ha |
| Sowing or Planting Date | Jul. 4, 2017 |

Trial Layout:

| Trial Environment (Test Method) | Greenhouse |
|---|---|
| Experimental Design | RANDOMIZED COMPLETE BLOCK |
| Plot size | 60 m2 |
| # replications | 4 |

Application Details

| Application Date | Jul. 4, 2017 |
|---|---|
| Application method | Drench |
| Application volume | 100 ml per plant |
| Treatments applied | 2, 3, 4, 5 |

Assessments:
Pest Incidence, 132 Days after Planting

| Treatment | AI Rate (g AI/ha) | Pest incidence (%), significantly different (Treatments with no letter in common are significantly different at the 5% probability level) | % efficacy based on pest incidence |
|---|---|---|---|
| CHECK | — | 78.33 A | 0.00 |
| COMPOUND 1 SC 450 | 100 | 5.00, B | 95.75 |
| COMPOUND 2 SC 200: Succinate dehydrogenase inhibitor (PYDIFLUMETOFEN) | 100 | 15.00, B | 80.85 |
| COMPOUND 3: RUDIS 480 SC (PROTHIOCONAZOLE) | 200 | 30.00, B | 61.70 |
| COMPOUND 4: TOPSIN M 70 WG (THIOPHANATE-METHYL) | 840 | 61.67, A | 21.26 |

CONCLUSION

Compound 1 showed excellent efficacy against *Fusarium oxysporum* with 95% control at a rate of 100 g AI per hectare. Compound 1 protected the plant from *Fusarium* attack up to 132 days after transplanting. Compound 2 was weaker with 80% control followed by compound 3 with an efficacy of 61% and compound 4 with only 21% control at much higher application rates.

*Fusarium oxysporum* on Okra:

An okra field trial was carried out in Kuppanur, Coimbatore, India in 2018 to evaluate the efficacy of different compounds against *Fusarium oxysporum* in okra.

The okra seeds were planted on Jun. 29, 2018 and directly afterwards drench applied with the compounds using a water volume of 50 ml per plant. The disease occurred two weeks after planting and an assessment on disease incidence and was done Aug. 28, 2018.

Trial Location:

| Trial Location | Sown | Crop | Variety | Resistance Status |
|---|---|---|---|---|
| Kuppanur, Coimbatore, India | 29 Jun. 2018 | Okra | Samrat | Susceptible |

Treatment List—Field Trials:

| | Treatment | Active ingredient (AI) Rate (g AI/ha) | Application method |
|---|---|---|---|
| 1 | CHECK | — | — |
| 2 | COMPOUND 1 SC 450 | 100 | Drench at planting |
| 3 | COMPOUND 1 SC 450 | 150 | Drench at planting |

|   | Treatment | Active ingredient (AI) Rate (g AI/ha) | Application method |
|---|---|---|---|
| 4 | COMPOUND 1 SC 450 | 200 | Drench at planting |
| 5 | COMPOUND 2 SC500: Commercial standard: Succinate dehydrogenase inhibitor SC500 (Fluopyram) | 375 | Drench at planting |

Crops and Targets Occurred in the Trial:

|   | Latin name | Common name |
|---|---|---|
| Target | *Fusarium oxysporum* | *Fusarium* wilt |
| Crop | *Abelmoschus esculentus* | Okra |

Crop Description:

| Test Crop | Okra |
|---|---|
| Variety | Samrat |
| Sowing density | 30000 plants/ha |
| Sowing or Planting Date | 29 Jun. 2018 |

Trial Layout:

| Trial Environment (Test Method) | Field trial |
|---|---|
| Experimental Design | RANDOMIZED COMPLETE BLOCK |
| Plot size | 20 m2 |
| # replications | 4 |

Application Details:

| Application Date | 29 Jun. 2018 |
|---|---|
| Application method | Drench |
| Slurry Volume | 50 ml per plant |
| Treatments applied | 2, 3, 4, 5, 6 |

Assessments:
Pest Incidence, 60 Days after Planting

|   | Treatment | AI Rate (g AI/ha) | Pest incidence (%), significantly different (Treatments with no letter in common are significantly different at the 5% probability level) | % efficacy based on pest incidence |
|---|---|---|---|---|
| 1 | CHECK | — | 84.20, A | 0.00 |
| 2 | COMPOUND 1 SC 450 | 100 | 44.60, B | 47.03 |
| 3 | COMPOUND 1 SC 450 | 150 | 13.20, D | 84.32 |
| 4 | COMPOUND 1 SC 450 | 200 | 4.60, E | 94.54 |
| 5 | COMPOUND 2 SC500: Commercial standard: Succinate dehydrogenase inhibitor SC500 (Fluopyram) | 375 | 20.50, C | 75.65 |

CONCLUSION

Compound 1 showed excellent efficacy against *Fusarium oxysporum* at a rate of 150 g and 200 g AI/ha, with an efficacy of 84% and 94%, respectively. The 200 g AI/ha rate of compound 1 provided almost full disease control over a duration of 60 days after planting. Compound 2 performed well at a rate of 375 g/AI ha, but was clearly weaker than compound 1 applied at 200 g AI/ha.

*Fusarium oxysporum* in Melon:

A melon greenhouse trial was carried out in El Ejido, Almeria, Spain in 2017 to evaluate the efficacy of different compounds against *Fusarium oxysporum* in melon.

The melon transplants were planted on May 5, 2017 and the afterwards drench applied with the compounds using a water volume of 100 ml per plant.

In order to increase the disease pressure each plot has been inoculated with 900 ml *Fusarium oxysporum* suspension with a concentration of 100'000 spores per millilitre of water three days before transplanting. The first disease symptoms were visible three weeks after transplanting and an assessment on disease severity and was done 69 days after transplanting on Jul. 13, 2017.

Trial Location:

| Trial Location | Sown | Crop | Variety | Resistance Status |
|---|---|---|---|---|
| El Ejido, Almeria, Spain | 5 May 2017 | Melon | Brisa | Susceptible |

Treatment List—Field Trials:

|   | Treatment | AI Rate (g AI/ha) | Application method |
|---|---|---|---|
| 1 | CHECK | — | — |
| 2 | COMPOUND 1 SC 450 | 60 | Drench at planting |
| 3 | COMPOUND 2 SC 200: Succinate dehydrogenase inhibitor (PYDIFLUMETOFEN) | 60 | Drench at planting |
| 4 | COMPOUND 3: RUDIS 480 SC (PROTHIOCONAZOLE) | 120 | Drench at planting |
| 5 | COMPOUND 4: TOPSIN M 70 WG (THIOPHANATE-METHYL) | 500 | Drench at planting |

Crops and Targets Occurred in the Trial

|   | Latin name | Common name |
|---|---|---|
| Target | *Fusarium oxysporum* | *Fusarium* wilt |
| Crop | *Citrullus lanatus* | Melon |

Crop Description:

| Test Crop | MELON |
|---|---|
| Variety | Brisa |
| Sowing density | 15000 plants/ha |
| Sowing or Planting Date | 05 May 2017 |

Trial Layout:

| Trial Environment (Test Method) | Greenhouse |
|---|---|
| Experimental Design | RANDOMIZED COMPLETE BLOCK |
| Plot size | 9 m2 |
| # replications | 4 |

Application Details:

| | |
|---|---|
| Application Date | 05 May 2018 |
| Application method | Drench |
| Application volume | 100 ml per plant |
| Treatments applied | 2, 3, 4, 5 |

Assessments:
Pest Severity, 69 Days after Planting

| Treatment | AI Rate (g AI/ha) | Pest severity (%), significantly different (Treatments with no letter in common are significantly different at the 5% probability level) | % efficacy based on pest severity |
|---|---|---|---|
| CHECK | — | 82.41, A | 0.00 |
| COMPOUND 1 SC 450 | 60 | 8.33, B | 89.89 |
| COMPOUND 2 SC 200: Succinate dehydrogenase inhibitor (PYDIFLUMETOFEN) | 60 | 16.67, B | 79.77 |
| COMPOUND 3: RUDIS 480 SC (PROTHIOCONAZOLE) | 120 | 26.85, B | 67.42 |
| COMPOUND 4: TOPSIN M 70 WG (THIOPHANATE-METHYL) | 500 | 22.22, B | 73.04 |

CONCLUSION

Compound 1 showed very good efficacy against *Fusarium oxysporum* with 89% control at a rate of 60 g AI per hectare. Compound 2 was weaker with 79% control followed by compound 4 with an efficacy of 73% and compound 3 with 67% control.

What is claimed is:

1. A method of controlling or preventing infestation of tomato plants from *Alternaria solani* comprising:
    identifying a crop tomato plants, the locus thereof, or propagation material thereof under disease pressure from *Alternaria solani*;
    applying to the crop of tomato plants, the locus thereof, or propagation material thereof, a composition comprising a compound according to formula (Ia) or formula (Ib)

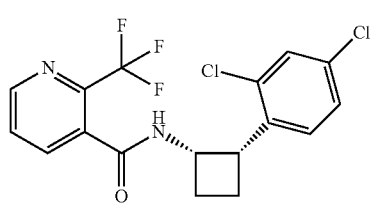

(Ia)

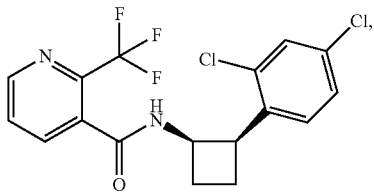

(Ib)

or a combination thereof;
    wherein the compound of formula (Ia) or formula (Ib) is applied at rate of 1 to 500 g/ha or 2 to 200 mg/L; and
    wherein the composition provides at least 81% control of *Alternaria solani* on tomato plants.

2. The method according to claim 1, wherein the ratio of the compound of formula (Ia) to the compound of formula (Ib) is greater than 1.5:1.

3. The method according to claim 1, wherein the ratio of the compound of formula (Ia) to the compound of formula (Ib) is greater than 2.5:1.

4. The method according to claim 1, wherein the ratio of the compound of formula (Ia) to the compound of formula (Ib) is greater than 4:1.

5. The method according to claim 1, wherein the ratio of the compound of formula (Ia) to the compound of formula (Ib) is greater than 9:1.

6. The method according to claim 1, wherein the ratio of the compound of formula (Ia) to the compound of formula (Ib) is greater than 20:1.

7. The method according to claim 1, wherein the ratio of the compound of formula (Ia) to the compound of formula (Ib) is greater than 35:1.

8. The method according to claim 1, wherein the applying is of the compound of formula (Ia) only.

9. The method according to claim 1, wherein the applying is by spraying the tomato.

10. The method according to claim 1, wherein the applying is by drenching.

11. The method according to claim 1, wherein the compound of formula (Ia) or formula (Ib) is applied at rate of 1 to 500 g/ha.

12. The method according to claim 1, wherein the compound of formula (Ia) or formula (Ib) is applied at rate of 2 to 200 mg/L.

13. The method according to claim 1, wherein the applying is to the propagation material.

14. The method according to claim 1, wherein the applying is to the locus thereof.

15. The method according to claim 1, wherein the applying is to the crop of tomato plants.

* * * * *